(12) United States Patent
Ishida

(10) Patent No.: US 12,226,940 B2
(45) Date of Patent: Feb. 18, 2025

(54) MOLDING SCREW, FREE BLEND INJECTION MOLDING MACHINE, AND FREE BLEND-TYPE RESIN MOLDED BODY MANUFACTURING METHOD

(71) Applicant: Daiichi Seikosha Co., Ltd., Osaka (JP)

(72) Inventor: Yasuhiko Ishida, Osaka (JP)

(73) Assignee: Daiichi Seikosha Co., Ltd., Osaka (JP)

( * ) Notice: Subject to any disclaimer, the term of this patent is extended or adjusted under 35 U.S.C. 154(b) by 70 days.

(21) Appl. No.: 17/595,952

(22) PCT Filed: Sep. 29, 2020

(86) PCT No.: PCT/JP2020/036829
§ 371 (c)(1),
(2) Date: Nov. 30, 2021

(87) PCT Pub. No.: WO2021/070670
PCT Pub. Date: Apr. 15, 2021

(65) Prior Publication Data
US 2022/0227033 A1     Jul. 21, 2022

(30) Foreign Application Priority Data

Oct. 9, 2019   (JP) ................................. 2019-185857

(51) Int. Cl.
| | | |
|---|---|---|
| *B29C 45/00* | (2006.01) | |
| *B29B 7/00* | (2006.01) | |
| *B29B 7/42* | (2006.01) | |
| *B29B 7/88* | (2006.01) | |
| *B29C 45/03* | (2006.01) | |
| *B29C 45/08* | (2006.01) | |
| *B29C 45/50* | (2006.01) | |
| *B29C 45/60* | (2006.01) | |

(Continued)

(52) U.S. Cl.
CPC ............. *B29C 45/60* (2013.01); *B29B 7/429* (2013.01); *B29B 7/88* (2013.01); *B29C 45/03* (2013.01); *B29C 45/5008* (2013.01)

(58) Field of Classification Search
CPC .......... B29C 45/03; B29C 45/60; B29B 7/429
See application file for complete search history.

(56) References Cited

U.S. PATENT DOCUMENTS 5,141,326 A * 8/1992 Eshima ................. B29C 48/535
366/89
2017/0355119 A1* 12/2017 Nobuta ..................... B29B 7/24

FOREIGN PATENT DOCUMENTS

EP     3381644 A1 * 10/2018  ............. B29C 45/60
JP     5528816 A     2/1980
(Continued)

OTHER PUBLICATIONS

JP-2002283421 (ETO) Oct. 2002 (online machine translation), [Retrieved on Aug. 26, 2023]. Retrieved from: Google (Year: 2002).*

(Continued)

*Primary Examiner* — Alison L Hindenlang
*Assistant Examiner* — Andres E. Behrens, Jr.
(74) *Attorney, Agent, or Firm* — Fox Rothschild LLP

(57) ABSTRACT

Provided are a molding screw and an FBI molding machine using the same for manufacturing resin molded articles for reduced manufacturing variation with use of a resin powder, an additive, and a mixture material constituted by an inorganic material or an organic material. The molding screw can include a feeding portion for feeding a molding material, a compressing portion, and a metering portion that extend continuously from the feeding portion. The feeding portion and the compressing portion each can be provided with a spiral flight. The flight of the compressing portion can include multiple sub flights that extend in a spiral manner in a screw axis direction. The sub flights can each have a polygonal shape with rounded corner portions, and are arranged such that the corner portions are shifted by a set angle with respect to the screw axis.

8 Claims, 17 Drawing Sheets

(51) Int. Cl.
  *B29C 48/00*   (2019.01)
  *B29C 48/53*   (2019.01)
  *B29C 48/645*  (2019.01)
  *B29C 48/65*   (2019.01)
  *B29C 48/655*  (2019.01)

(56) References Cited

FOREIGN PATENT DOCUMENTS

| JP | 07276451 A | * | 10/1995 | ......... B29C 47/6018 |
|---|---|---|---|---|
| JP | 2002283421 | * | 10/2002 | ......... B29C 45/0005 |
| JP | 2009045745 A | * | 3/2009 | ............. B29C 48/53 |
| JP | 2018167518 A | * | 11/2018 | ............. B29C 45/60 |
| JP | 2019014115 A | * | 1/2019 | |
| WO | 2016/113776 A1 | | 7/2016 | |

OTHER PUBLICATIONS

Angadi, Gangadhar, et al. "Effect of Screw Configuration on the Dispersion of Nanofillers in Thermoset Polymers." Journal of Polymer Engineering, vol. 37, No. 8, De Gruyter, Oct. 2017, pp. 815-825. https://doi.org/10.1515/polyeng-2015-0427. (Year: 2017).*

Gaspar-Cunha, António, and J. A. Covas. Optimization in Polymer Processing. 2011., Chapter 5 (Year: 2011).*

Understanding Screw Design for Film Extrusion Process—Macro Engineering and Technology. www.macroeng.com/understanding-screw-design-for-film-extrusion-process.php, 2015 (Year: 2015).*

JP-2009045745 (Kitagishi) Aug. 2007 (online machine translation), [Retrieved on Mar. 22, 2024]. Retrieved from: Espacenet (Year: 2007).*

JP-2019014115-A (Urano) Jan. 2019 (online machine translation), [Retrieved on Nov. 18, 2024]. Retrieved from: Espacenet (Year: 2019).*

JP-07276451-A (Takeshi) Oct. 1995 (online machine translation), [Retrieved on Nov. 18, 2024]. Retrieved from: Espacenet (Year: 1995).*

JP-2018167518-A (Koji) Nov. 2018 (online machine translation), [Retrieved on Nov. 18, 2024]. Retrieved from: Espacenet (Year: 2018).*

International Search Report issued Nov. 17, 2020 in Application No. PCT/JP2020/036829 with English translation (4 pages).

* cited by examiner flow direction

A-A cross-sectional view

F-F cross-sectional view     E-E cross-sectional view

D-D cross-sectional view    C-C cross-sectional view

B-B cross-sectional view

MOLDING SCREW, FREE BLEND INJECTION MOLDING MACHINE, AND FREE BLEND-TYPE RESIN MOLDED BODY MANUFACTURING METHOD

CROSS-REFERENCE AND CLAIM OF PRIORITY

This application is a U.S. national stage application of International Application Serial No. PCT/JP2020/036829, filed on Sep. 29, 2020, which claims priority to Japanese application Serial No.: 2019-185857, filed on Oct. 9, 2019, the entireties of which are hereby incorporated by reference.

TECHNICAL FIELD

The present disclosure relates to an injection molding machine used in free blend injection in which a powder made of various materials including metal and wood pieces and a resin powder are directly mixed and molded, as well as a molding screw used in the injection molding machine, and a free blend-type resin molded body manufacturing method.

BACKGROUND

Many types of petroleum-based resins that have various functions have been developed, and such resins have excellent processability. For this reason, resin products are widely used in all sorts of applications in society, such as not only in electrical appliances and household appliances, but also in automobile parts and building parts.

One method of manufacturing a desired product using resin is injection molding, in which the resin is melted and molded using a mold. In injection molding, pellets formed into a certain shape in advance are introduced from a hopper into a cylinder and are melted and kneaded with a molding screw while being moved toward the outlet side, and the melted resin is poured into a mold to mold a resin product. Even in the case of using resin materials that have various functions and characteristics, by pre-processing such resin materials into pellets that have a certain shape in advance, it is possible to manufacture various resin molded bodies using the same resin molding machine.

Resin molded articles are generally often mass-produced. Accordingly, it is important in manufacturing to reduce variation in the quality of manufactured resin molded articles. To achieve this, an injection molding machine is required to have a device structure that is capable of sufficiently melting and kneading a resin material.

An injection molding screw that has a high plasticizing capability, uniform melting, and improved kneading and dispersibility has been disclosed. This screw includes a mixing portion at the leading end of the metering zone (mold-side portion) and in the region corresponding to the outer peripheral surface of a plunger arranged at a distance (clearance) from the cylinder. The mixing portion includes dead-end grooves that are closed at one end, and the grooves are alternatingly arranged in opposite directions so as not to be in communication with each other. This mixing portion has a structure in which a main flight having a small clearance with the cylinder and sub flights having a slightly larger clearance than the main flight are arranged alternatingly, and the sub flights are arranged discontinuously to form protrusions and recessions.

With such a structure, resin forcibly scraped away by the main flight accumulates in dead-end grooves provided between the main flight and the sub flights. Next, while moving over the low-height sub flights, the resin moves from the recessions of the sub flights, moves through adjacent grooves that have open leading ends, and accumulates at the leading end the screw. Accordingly, it is possible to achieve a good stirring effect, kneading effect, and plasticizing capability (e.g., see Patent Document 1).

A molding screw developed for the purpose of improving kneading action and making the resin temperature uniform has also been disclosed. In this screw, screw groove bottom surfaces extend between screw flights from an intermediate point in the compressing portion to an intermediate point in the metering portion, such screw groove bottom surfaces are alternatingly shifted in the radial direction along the screw flights, and the screw groove bottom surfaces on the shifted side form protrusions and recessions (e.g., see Patent Document 2).

An injection molding machine and a screw capable of uniformly dispersing reinforcing fibers in melted resin when the reinforcing fibers are mixed with the melted resin and injection molded have also been disclosed. The screw provided in this injection molding machine is provided with a kneading portion on the downstream side of the compressing portion. Three spiral-shaped groove portions are formed extending in the direction opposite to the orientation of the flights in the kneading portion. These groove portions prevent the reinforcing fibers from being broken, and can maintain the fiber length. Also, even if the reinforcing fibers become entangled in the compressing portion, the fibers are untangled in the kneading portion, and thus the long fibers in the melted resin are less likely to undergo shearing. As a result, the reinforcing fibers are uniformly dispersed, and a product having excellent mechanical properties can be obtained (e.g., see Patent Document 3).

The screws and resin molding machines described in these related documents are based on the premise of using resin pellets that have been processed into a constant shape in advance. Also, in the manufacturing of a resin molded body that contains reinforcing fibers described in Patent Document 3 as well, it is described that thermoplastic resin pellets provided with reinforcing fibers in advance are used.

A device for performing injection molding directly from a raw material resin without pelletizing the resin, and a screw used for the same, have also been disclosed. This device has good melting, kneading, and dispersion capabilities for the raw material resin, and can obtain a resin molded article that has excellent mechanical strength as a molded article. The screw used in this device includes a double wave structure constituted by first wave grooves and second wave grooves that spiral in the axial direction between screw flights. Regarding the elliptical shape of the cross section of the first wave grooves and the second wave grooves in this screw structure, their major axes have a constant angle α of 30 to 150° and a deviation angle α of 90° (e.g., see Patent Document 4).

CITATION LIST

Patent Documents

Patent Document 1: JP H06-218781A
Patent Document 2: JP H08-039636A
Patent Document 3: JP 2017-105184A
Patent Document 4: JP 2002-234063A

SUMMARY

The invention described in Patent Document 1 aims to improve resin kneading capability and dispersion, but there is no disclosure or suggestion regarding the use of materials other than resins.

Also, the invention described in Patent Document 2 aims to make the resin temperature uniform by improving the kneading action. This is suitable for resins such as polypropylene (PP) and polyethylene (PE), but there is no disclosure or suggestion of using materials other than resins.

An object of the invention described in Patent Document 3 is to produce a composite resin molded body that includes a thermoplastic resin and reinforcing fibers by using an injection molding method. In manufacturing, thermoplastic resin pellets provided with reinforcing fibers in advance are used, and there is no disclosure or suggestion of using reinforcing fibers not provided in pellets.

The invention described in Patent Document 4 is directed to performing injection molding directly using a raw material resin without pelletizing it. In the embodiments, only the characteristics of a molded article molded using recycled PET or a modifier and cap waste recycled polyolefin as the raw material resin are shown. It is also described that PET, polyolefins such as polyethylene and polypropylene, and the like can be used the raw material resin, but that the resin is not particularly limited to such examples. From this disclosure content, it can be determined that there is no disclosure or suggestion regarding the manufacture of a molded body containing a material other than resin.

Resins are used in various fields due to having excellent processability, being inexpensive, and having high durability. However, since resins do not decompose naturally, waste processing has become a major issue. Currently, resin waste discarded from homes and factories is separated out and partially reused. However, the majority of resin waste is buried or incinerated. Burial causes environmental destruction, and incineration is not desirable from the viewpoint of protecting the global environment. Therefore, the reuse of resin molded articles after use is desired. There is also demand for the ability to reuse metal products, wood products, ceramic products, and organic substances such as coffee slag that have not been able be used in manufacturing or after being used in products. If such materials can be mixed with resin to produce products with new added value, not only will resources be used effectively, but this is also environmentally friendly.

However, in most conventional injection molding machines and manufacturing methods using them, pellets are prepared in advance, and the pellets are mixed and kneaded for molding. When a resin molded body is manufactured using a conventional resin molding machine with the use of a mixture of various materials instead of using pellets, there is a problem that the quality of the product varies a large amount.

An object of the present disclosure is to obtain a molded article that has little manufacturing variation and quality variation even when manufacturing a resin molded article with use of a mixture material such as a metal material, wood, ceramic, stone, resin, or an organic material such as squeezed coffee residue, along with a resin powder and a suitable additive. In order to achieve this, disclosed embodiments provide a free blend injection molding machine, a molding screw used for the same, and a free blend-type resin molded body manufacturing method.

A molding screw according to an aspect of the present disclosure is for use in a free blend injection molding machine (hereinafter called an "FBI molding machine"), and includes: a feeding portion configured to feed a molding material that includes a mixture material, a resin powder, and an additive; and a compressing portion and a metering portion that extend continuously from the feeding portion, and a spiral flight is formed in each of the feeding portion and the compressing portion. The flight of the compressing portion includes a plurality of sub flights that extend in a spiral manner in a screw axis direction. The sub flights each have a polygonal shape with rounded corner portions, and the sub flights are arranged such that the corner portions are shifted by a set angle with respect to a screw axis. The sub flights are formed such that gaps between a cylinder inner surface and the corner portions are smallest and gaps between the cylinder inner surface and central portions between the corner portions are largest. The metering portion is provided with a plurality of blending/aligning portions each having gear-like protrusions and recessions in a circumferential direction about the screw axis.

In the above, a configuration is possible in which the molding screw has a plurality of configurations that are different with respect to at least one among the number of flights of the compressing portion, the number or polygonal shape of the sub flights, the number of blending/aligning portions in the metering portion, the shape or number of gear-like protrusions and recessions of the blending/aligning portions, and the length of the blending/aligning portions in the screw axis direction.

Specifically, a configuration is possible in which four of the sub flights are provided, and the sub flights are each shaped as an equilateral triangle, have curved surfaces that recede toward the screw axis between the corner portions, and are arranged such that the corner portions are shifted by an angle of about 30° each in a view along the screw axis direction.

Alternatively, a configuration is possible in which four of the sub flights are provided, and the sub flights are each shaped as a square, and are arranged such that the corner portions are shifted by an angle of about 22.5° each in a view along the screw axis direction.

Furthermore, a configuration is possible in which three of the sub flights are provided, and the sub flights are each shaped as an equilateral triangle, have curved surfaces that recede toward the screw axis between the corner portions, and are arranged such that the corner portions are shifted by an angle of about 45° each in a view along the screw axis direction.

Also, a configuration is possible in which the blending/aligning portions of the metering portion have an identical shape and are arranged such that positions of the protrusions and recessions match each other.

Alternatively, a configuration is possible in which the blending/aligning portions of the metering portion have different lengths in the screw axis direction, are arranged such that the length is different between adjacent blending/aligning portions, and are arranged such that positions of the protrusions and recessions match each other. Furthermore, a configuration is possible in which the blending/aligning portions of the metering portion have different numbers of gear-like protrusions and recessions and are arranged such that the number of gear-like protrusions and recessions is different between adjacent blending/aligning portions. Also, a configuration is possible in which the blending/aligning portions of the metering portion have different shapes of gear-like protrusions and recessions and are arranged such that the shape of the gear-like protrusions and recessions is different between adjacent blending/aligning portions.

As described above, the molding screw of the present disclosure includes the compressing portion, in which a plurality of sub flights that have rounded corner portions but are polygonal overall are arranged shifted at a certain angle, and the aligning portion that includes the blending/aligning portions that have gear-like protrusions and recessions.

In the regions where the distance between the inner surface of the cylinder and the sub flights is small (the gaps between the cylinder inner surface and the corner portions of the sub flights), the molding material is subjected to stronger compressive force and moves more quickly. On the other hand, in the regions where the distance is large (the gaps between the cylinder inner surface and the central portions between the corner portions), the molding material is subjected to less compressive force and moves more slowly. Uniform kneading is achieved by repeating this fast movement and slow movement. As a result, it is possible to obtain resin molded bodies that have high quality and little manufacturing variation, which are feature of the free blend method.

Also, the metering portion has a structure in which a plurality of blending/aligning portions provided with gear-like protrusions and recessions are arranged side by side. In the recession portions, the molding material moves more easily, and even a fiber-like mixture material is not likely to be cut, and thus it is possible to increase the proportion of fibers whose length remains the same as at the time of introduction. As a result, a high-strength molded body can be realized.

The molding screw may have a plurality of configurations that are different with respect to at least one among the number of flights of the compressing portion, the number or polygonal shape of the sub flights, the number of blending/aligning portions in the metering portion, the shape or number of gear-like protrusions and recessions of the blending/aligning portions, and the length of the blending/aligning portions in the screw axis direction. This therefore makes it possible to select a molding screw having an optimum configuration in accordance with the molding material. Even in the case where the type of mixture material and resin are appropriately selected in order to realize the function and characteristics of the desired molded body, a molded body having little variation can be obtained by using a molding screw that is in accordance with the selected materials.

For example, when coffee slag or cypress powder is used as the mixture material and an appropriate resin powder is used, if the number and shapes of portions in the configurations of the compressing portion and the metering portion of the molding screw are selected mainly in accordance with the properties of the mixture material, it is possible to obtain a resin molded body that has high quality and little manufacturing variation.

Note that in the present disclosure, the molding material includes a mixture material, a resin powder, and an additive. The mixture material is a material that realizes a function that cannot be obtained with the resin powder alone, and is a concept including recycled materials or remnant materials of resin molded articles, metal materials, ceramic materials, or stone or wood materials, as well as fiber materials such as carbon fiber, glass fiber, or nano cellulose, and organic materials such as coffee slag, paper or materials having or not having a scent component. Examples of metal materials include not only materials containing a single metal such as iron, copper, aluminum, tungsten, or zirconium, but also an alloy material such as stainless steel or brass. Note that the resin molded article referred to here is a product obtained by pulverizing and reusing a molded product, and is a concept including both a thermosetting resin molded article and a thermoplastic resin molded article.

Examples of the resin powder include polypropylene (PP) and polyethylene (PE), which are olefin resins, polystyrene (PS), which is a styrene resin, polyphenylene terephthalate (PPS), polybutylene terephthalate (PBT), and polyamide (PA), and any resin material usually used when manufacturing a resin molded body by injection molding can be used without any particular problem.

The free blend method in the present disclosure refers to a method in which a powder or fiber material is introduced into a molding machine and molded without being pelletized in advance.

Next, a free blend injection molding machine according to an aspect of the present disclosure includes: a cylinder provided with a heater configured to heat an interior of the cylinder; a molding screw rotatably provided in the cylinder; a molding machine hopper configured to introduce, into the cylinder, a molding material that includes a mixture material, a resin powder, and an additive; a driving portion configured to drive the molding screw to rotate; and a mold including a back pressure applying portion configured to apply back pressure for pushing the molding screw toward the mold, and a cavity into which the molding material having an increased liquidity is injected, the cavity being provided at a leading end portion side of the molding screw, wherein the molding screw is the molding screw having the above configuration.

In this case, a configuration is possible in which the free blend injection molding machine further includes: a kneading portion that includes a metering hopper configured to meter the mixture material, the resin powder, and the additive, and a mixing drum configured to mix and knead the mixture material, the resin powder, and the additive.

A configuration is possible in which the molding screw has a plurality of configurations that are different with respect to at least one among the number of flights of the compressing portion, the number or polygonal shape of the sub flights, the number of blending/aligning portions in the metering portion, the shape or number of gear-like protrusions and recessions of the blending/aligning portions, and the length of the blending/aligning portions in the screw axis direction, and one of the configurations of the molding screw is selected for use in accordance with the molding material.

According to this device configuration, it is possible to obtain resin molded articles that have high quality and little variation even if various types of mixture materials and resin powders are used as the molding material.

A free blend-type resin molded body manufacturing method according to an aspect of the present disclosure includes the steps of: introducing a molding material that includes a mixture material, a resin powder, and an additive into a molding machine hopper; feeding the introduced molding material from a feeding portion of a molding screw configured to rotate in a cylinder toward an outlet, kneading the molding material with a compressing portion of the screw to perform blending homogenization and alignment, and further kneading and aligning the molding material with a metering portion of the screw while maintaining a blended state; injecting the molding material, which is in a melted state and accumulated at an outlet side of the cylinder, into a mold while applying pre-set back pressure to the screw; and retrieving a resin molded article from the mold after cooling of the molding material that was injected into the mold.

Also, the molding screw includes the feeding portion configured to feed the molding material, and the compressing portion and the metering portion that extend continuously from the feeding portion, a spiral flight being formed in each of the feeding portion and the compressing portion. The flight of the compressing portion includes a plurality of sub flights that extend in a spiral manner in a screw axis direction. The sub flights each have a polygonal shape with rounded corner portions, and the sub flights are arranged such that the corner portions are shifted by a set angle with respect to a screw axis. The sub flights are formed such that distances between a cylinder inner surface and the corner portions are smallest and distances between the cylinder inner surface and central portions between the corner portions are largest. The metering portion is provided with a plurality of blending/aligning portions each having gear-like protrusions and recessions in a circumferential direction about the screw axis. A molding screw having this configuration is used.

In this case, a configuration is possible in which the method further includes the steps of: metering the mixture material, the resin powder, and the additive that constitute the molding material; and kneading the mixture material, the resin powder, and the additive with a mixing drum, wherein the metering step and the kneading step are performed before the molding material is introduced into the molding machine hopper. If the molding material is sufficiently kneaded before being introduced into the molding machine hopper, it is possible to further improve compression, alignment, and kneading performed by the molding screw.

A configuration is possible in which the molding screw has a plurality of configurations that are different with respect to at least one among the number of flights of the compressing portion, the number or polygonal shape of the sub flights, the number of blending/aligning portions in the metering portion, the shape or number of gear-like protrusions and recessions of the blending/aligning portions, and the length of the blending/aligning portions in the screw axis direction, and one of the configurations of the molding screw is selected for use in accordance with the molding material.

For example, in the case where reinforcing fibers are used as the mixture material, a configuration may be used in which the molding screw has four sub flights, each sub flight has a triangular shape, curved surfaces that recede toward the screw axis are provided between the corner portions, the corner portions are shifted by an angle of about 30° each in a view along the screw axis direction, and the metering portion includes a plurality of blending/aligning portions that have the same shape and are arranged such that the protrusions and recessions match each other.

If manufacturing is performed using a molding screw having such a shape, fibers such as glass fibers or carbon fibers are less likely to be broken when mixed and kneaded, and it is possible to increase the proportion of fibers whose length remains the same as at the time of introduction. As a result, the mechanical strength of the resin molded body can be increased.

Also, in the case where a solid powder made of metal, ceramic, or stone is used as the mixture material for example, a configuration may be used in which the molding screw has four sub flights, each sub flight has a square shape, the corner portions are shifted by an angle of about 22.5° each in a view along the screw axis direction, and the metering portion includes a plurality of blending/aligning portions that have different lengths in the screw axis direction and are arranged such that the length is different between adjacent blending/aligning portions, and such that the protrusions and recessions match each other.

Although solid powders made of iron, ceramic, or the like and resin powders have very different specific densities, even materials having very different specific densities can be uniformly mixed and kneaded if manufacturing is performed using a molding screw having such a configuration. The quality and manufacturing variation can be reduced for the resin molded body, the quality is stable even if the inclusion ratio of solid powder such as iron powder is increased, and it is possible to obtain a surface condition and weight feeling that are closer to those of metal products and ceramic products than in the case of conventional products.

Also, in the case where a powder made of a plant-derived organic material is used as the mixture material for example, a molding screw having the following configuration may be used. Specifically, the molding screw has four sub flights, each sub flight has a square shape, the corner portions are shifted by an angle of about 22.5° each in a view along the screw axis direction, and the metering portion includes a plurality of blending/aligning portions that have the same shape and are arranged such that the protrusions and recessions match each other.

By using a molding screw having such a shape, even when coffee slag powder is used as a mixture material, overheating does not occur in the compressing portion and the kneading portion, and the mixture material can be kept in a relatively low temperature state. As a result, the water content in the coffee slag can be vaporized, the coffee odor remains, and a high-strength resin molded body with an excellent deodorant property can be obtained.

According to the present disclosure, mixing uniformity, alignment, and kneading properties can be improved even when a molding material that contains any of various mixture materials is directly introduced into a molding machine. It is possible to provide a molded body that has little product variation, and has high quality and high mechanical strength.

Also, various materials such as waste plastic, metal waste, fiber material, and natural materials such as wood can be utilized as the mixture material, thus making it possible to provide an environment-friendly molded body.

DETAILED DESCRIPTION

Figure 1A:
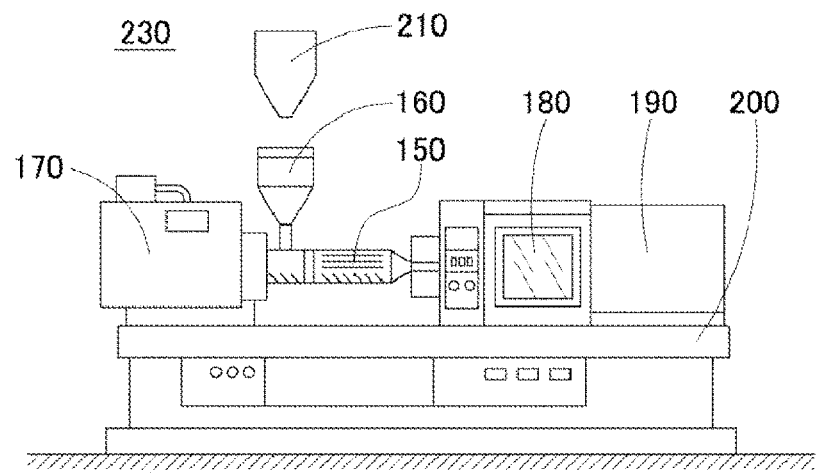
FIG. 1A is a schematic side view of an FBI molding machine according to an embodiment of the present disclosure.
Figure 1B:
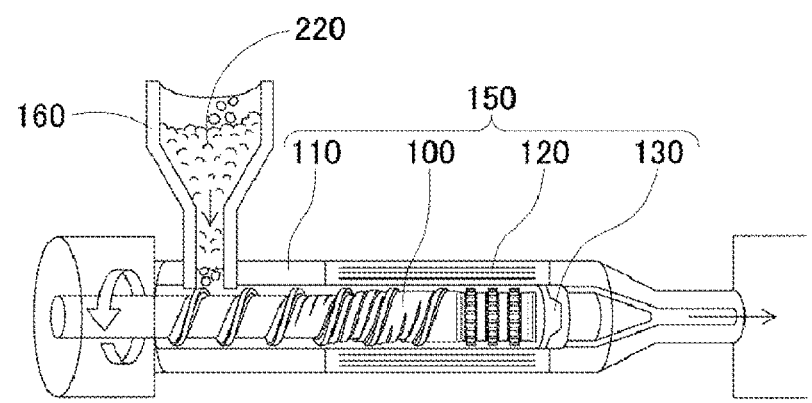
FIG. 1B is a schematic cross-sectional view of a cylinder portion of the FBI molding machine according to the embodiment.

A molding machine screw and an FBI molding machine according to an embodiment of the present disclosure are described below with reference to the drawings. FIG. 1A is a schematic side view of a free blend injection molding machine 230 according to the present embodiment. FIG. 1B is a schematic cross-sectional view of a cylinder portion 150.

Figure 2:
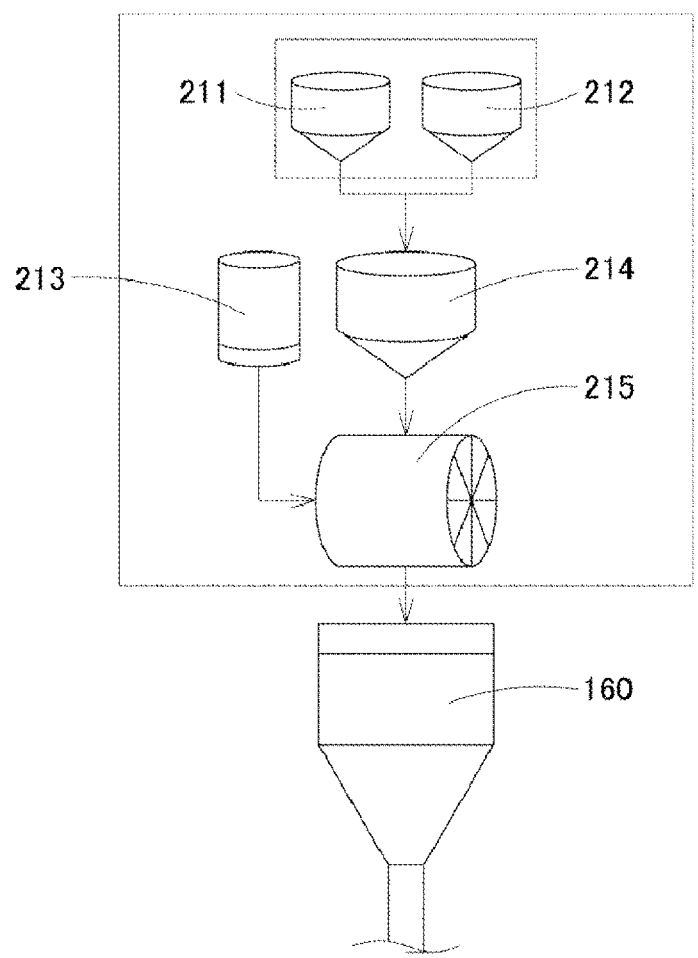
FIG. 2 is a diagram showing a configuration of a kneading portion used in the same embodiment.

FIG. 2 is a diagram showing the configuration of a kneading portion 210 used in the present embodiment. The kneading portion 210 is constituted by a resin hopper 211 into which a resin powder is introduced, a mixture material hopper 212 into which a mixture material is introduced, a metering hopper 214 that meters the resin powder and the mixture material, an additive hopper 213 into which an additive is introduced, and a mixing drum 215. The resin powder and the mixture material are introduced into the resin hopper 211 and the mixture material hopper 212 respectively, and are metered in the metering hopper 214. The materials are then introduced into the mixing drum 215. At this time, a required amount of additive is also added from the additive hopper 213. These materials are then kneaded by the mixing drum 215. According, when a molding material 220 is introduced into a molding machine hopper 160, it has been uniformly mixed, and the mixture material is in a state of being adhered to the resin due to the additive. For this reason, even if the mixture material is solid powder made of iron or ceramic, or a reinforcing fiber such as carbon fiber, more uniform blending, alignment, and kneading can be performed in the molding screw.

The molding screw can have multiple screw configurations that each have at least one difference in terms of the number of flights of the compressing portion N, number or polygonal shape of sub flights, number of blending/aligning portions in the metering portion S, shape and number of gear-like protrusions of the blending/aligning portions, and length of the blending/aligning portions in the screw axis direction, and the optimum screw shape may be selected and used in accordance with the molding material.

Figure 3A:
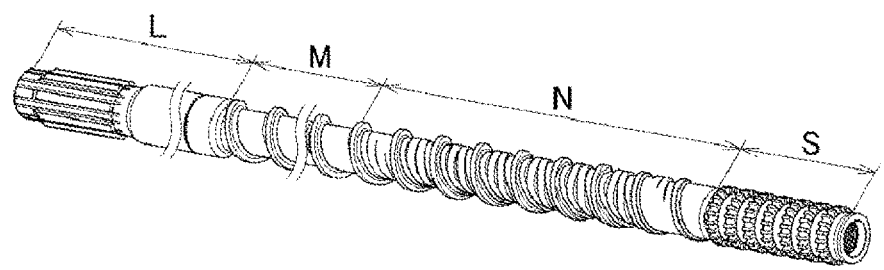
FIG. 3A is an overall schematic perspective view of a molding screw of the same embodiment.
Figure 3B:
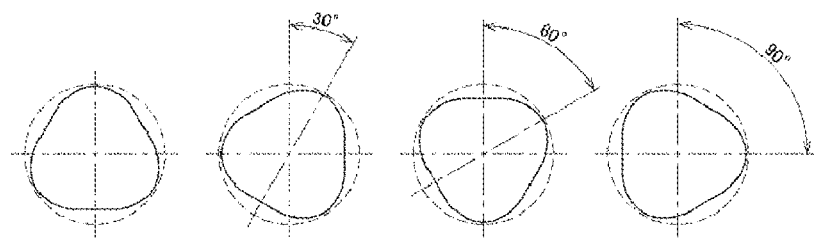
FIG. 3B is a diagram showing a first example of the shape of sub flights of the compressing portion in the same embodiment, and shows a configuration in which four triangular sub flights are provided.
Figure 3C:
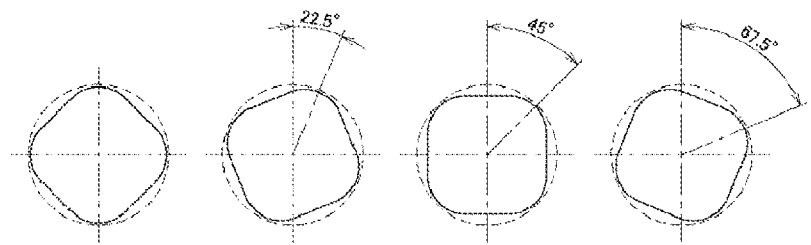
FIG. 3C is a diagram showing a second example of the shape of sub flights of the compressing portion in the same embodiment, and shows a configuration in which four quadrangular sub flights are provided.
Figure 3D:
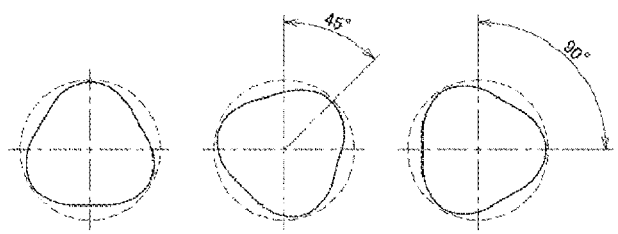
FIG. 3D is a diagram showing a third example of the shape of sub flights of the compressing portion in the same embodiment, and shows a configuration in which three triangular sub flights are provided.

FIG. 3A is an overall schematic perspective view of the molding screw. FIGS. 3B to 3D are diagrams illustrating various shapes and numbers of sub flights of the compressing portion N. FIG. 3B is a diagram showing a first example, and shows a configuration in which four triangular sub flights are provided. FIG. 3C is a diagram showing a second example, and shows a configuration in which four quadrangular sub flights are provided. FIG. 3D is a diagram showing a third example, and shows a configuration in which three triangular sub flights are provided.

As shown in FIG. 3A, the molding screw is constituted by a shaft portion L, a feeding portion M, a compressing portion N, and a metering portion S. A single flight extends from the feeding portion M to the compressing portion N, and the compressing portion N further includes sub flights.

In FIG. 3B, the sub flights have a triangular shape, four sub flights are provided in one flight, and the shifted arrangement angles thereof are shown. In FIG. 3C, the sub flights have a quadrangular shape, four sub flights are provided in one flight, and the shifted arrangement angles thereof are shown. In FIG. 3D, the sub flights have a triangular shape, three sub flights are provided in one flight, and the shifted arrangement angles thereof are shown.

Figure 4A:
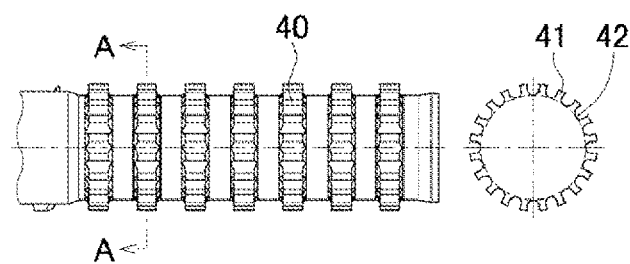
FIG. 4A is a diagram showing the shape of blending/aligning portions in a metering portion of the molding screw according to the same embodiment, and shows a configuration in which seven identical blending/aligning portions are provided.
Figure 4B:
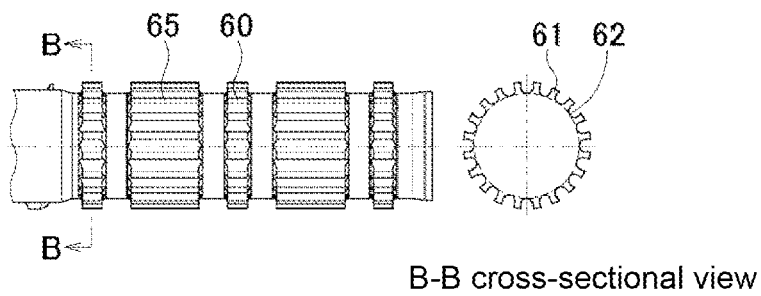
FIG. 4B is a diagram showing the shape of blending/aligning portions in the metering portion of the molding screw according to the same embodiment, and shows a configuration in which adjacent blending/aligning portions have different lengths, and a total of five blending/aligning portions are provided.
Figure 4C:
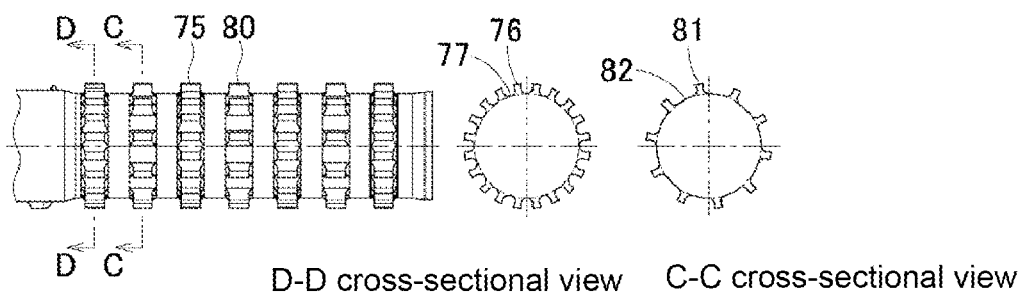
FIG. 4C is a diagram showing the shape of blending/aligning portions in the metering portion of the molding screw according to the same embodiment, and shows a configuration in which adjacent blending/aligning portions have different shapes, and a total of seven blending/aligning portions are provided.
Figure 4D:
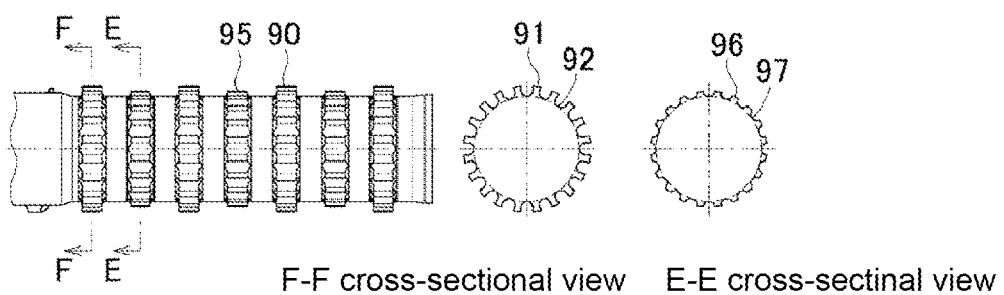
FIG. 4D is a diagram showing the shape of blending/aligning portions in the metering portion of the molding screw according to the same embodiment, and shows a configuration in which adjacent blending/aligning portions have different shapes of gear-like protrusions and recessions, and a total of seven blending/aligning portions are provided.

FIGS. 4A to 4D are diagrams illustrating various shapes and numbers of blending/aligning portions in the metering portion S of the molding screw. FIG. 4A includes a side view and an A-A cross-sectional view of a configuration of the metering portion S in which seven blending/aligning portions 40 having the same shape are arranged such that positions of the protrusions and recessions match each other. FIG. 4B includes a side view and a B-B cross-sectional view of a configuration of the metering portion S in which a total of five blending/aligning portions are provided, including blending/aligning portions 60 and 65 that have different lengths in the screw axis direction and are arranged alternatingly, and the blending/aligning portions are arranged such that positions of the protrusions and recessions match each other. FIG. 4C includes a side view, a C-C cross-sectional view, and a D-D cross-sectional view of a configuration of the metering portion S in which seven blending/aligning portions 75 and 80 having different numbers of protrusions and recessions are arranged alternatingly. FIG. 4D includes a side view, an E-E cross-sectional view, and an F-F cross-sectional view of a configuration of the metering portion S in which seven blending/aligning portions are provided, including blending/aligning portions 90 and 95 that have the same number of protrusions and recessions but different protrusion/recession heights and that are arranged alternatingly, and the blending/aligning portions are arranged such that positions of the protrusions and recessions match each other.

If appropriate sub flight shapes and blending/aligning portions are selected from among the various sub flight shapes and blending/aligning portions shown in FIGS. 3B to 4D in accordance with the molding material, high-quality resin molded articles having little variation can be obtained even if various mixture materials and resin powders are used as the molding material. The detailed structures of the sub flights and the blending/aligning portions shown in FIGS. 3B to 4D are described below in working examples.

The sub flights and the blending/aligning portions shown in FIGS. 3B to 4D are merely examples. The polygonal shape of the sub flights is not limited to being a triangular shape or a quadrangular shape, but rather is a concept including polygons with up to eight sides. In the case of a shape that has only two corners, such as an elliptical shape, the distance and region between the cylinder inner wall and the central portion between the corners of the screw are too large. Blending and alignment therefore cannot be performed sufficiently. On the other hand, if the polygonal shape is a shape having more than eight sides, the distance and region between the cylinder inner wall and the central portion between the corners of the screw are too small. In such a state, the compression ratio is too large, overheating occurs due to shearing force, and kneading is also too large. Therefore, the mixture material and resin used for blending may undergo breakdown. For this reason, normally used screws preferably have a polygonal shape having three to eight sides.

By using a molding machine and a molding screw having any of such configurations, it is possible to manufacture a resin molded body that has a certain functionality by using various mixture materials and a resin powder. Examples of functions include high strength, antibacterial properties, aromatic properties, metallic weight, brilliance, and deodorant properties, and the functionality of the mixture material can be maximized.

For example, if reinforcing fibers are used as the mixture material, a molding screw having the following shape can be used. Four sub flights are provided, each of which is triangular, and the sub flights have curved surfaces that recede toward the screw axis between the corner portions, and are arranged such that the corner portions are shifted by an angle of about 30° each in a view along the screw axis direction. The metering portion has a plurality of blending/aligning portions that have the same shape and are arranged such that the protrusions and recessions thereof match each other.

If manufacturing is performed using a molding screw having such a configuration, even when fibers such as glass fibers and carbon fibers are mixed and kneaded, the fibers are not likely to shear, and it is possible to increase the proportion of fibers whose length remains the same as at the time of introduction. As a result, the mechanical strength of the resin molded body can be increased.

Also, for example, when a solid powder such as metal, ceramic, or stone is used as the mixture material, a screw having the following shape can be used as the molding screw. There are four sub flights, each sub flight has a square shape, and the corners are arranged so that the angles viewed in the screw axis direction are each shifted by an angle of about 22.5°. The metering portion is constituted by blending/aligning portions that have different lengths in the screw axis direction, the blending alignment portions are arranged such that the lengths thereof are different between adjacent portions, and such that the protrusions and recessions match each other.

Solid powders made of iron, ceramic, or the like and resin powders have very different specific densities. However, if manufacturing is performed using a molding screw having the above-described shape, uniform alignment and kneading can be easily performed even when using materials that have very different specific densities. Therefore, variation in the quality of the resin molded body can be reduced, and the proportion of added solid powder such as iron powder can be increased. As a result, in comparison with conventional resin molded bodies, it is possible to obtain a surface state and a feeling of weight closer to those of metal products and ceramic products.

Also, when a powder made of a plant-derived organic material is used as the mixture material for example, a screw having the following shape can be used as the molding screw. There are four sub flights, each sub flight has a square shape, and the corners are arranged so that the angles viewed in the screw axis direction are each shifted by an angle of about 22.5°. The metering portion has a plurality of blending/aligning portions that have the same shape and are arranged such that the protrusions and recessions thereof match each other.

If manufacturing is performed using a molding screw having such a configuration, even when coffee slag powder is used as a mixture material, the material can be retained in the compressing portion and the kneading portion without overheating. As a result, the water content in the coffee slag can be vaporized, the coffee odor remains, and a resin molded body having excellent deodorant properties can be obtained.

Multiple working examples are provided below and are intended for illustrative purposes. The disclosure is not limited to these examples.

First Working Example

A molding machine screw, an FBI molding machine, and a manufacturing method using the same according to a first working example of the present disclosure are described below with reference to the drawings. First, the molding screw according to this working example and an FBI molding machine using the same will be described.

Figure 5A:
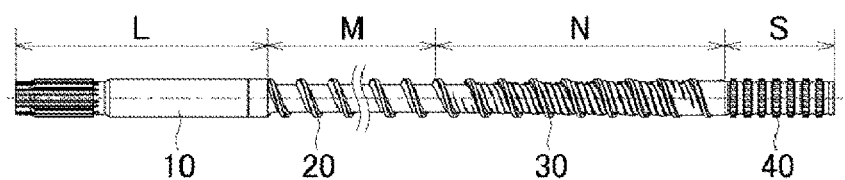
FIG. 5A is a schematic side view of a molding screw according to a first working example of the present disclosure.
Figure 5B:
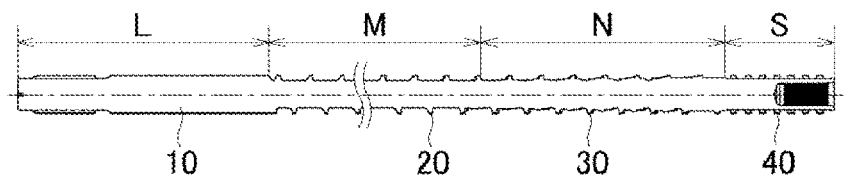
FIG. 5B is a cross-sectional view of the molding screw according to the first working example.
Figure 6A:
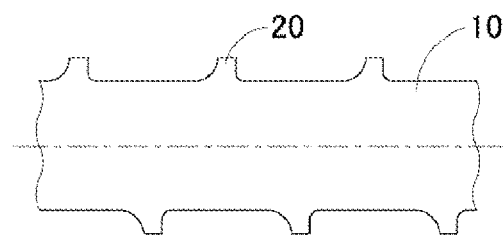
FIG. 6A is a partial diagram showing the configuration of the molding screw according to the first working example, and is a cross-sectional view of a feeding portion M.
Figure 6B:
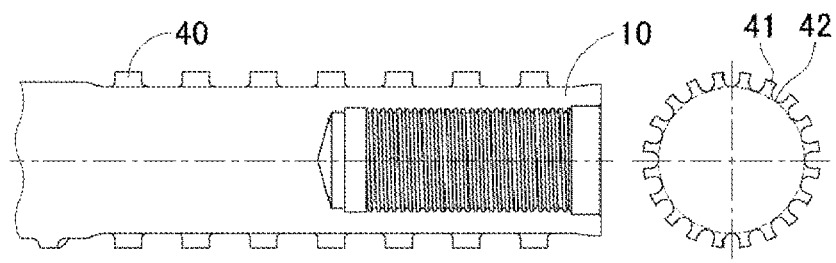
FIG. 6B is a partial diagram showing the configuration of the molding screw according to the first working example, and is a cross-sectional view showing the configuration of a metering portion S.

FIG. 5A is a schematic side view of the molding screw according to the first working example of the present disclosure. FIG. 5B is a cross-sectional view. FIG. 6A is a partial diagram showing the configuration of the molding screw in the first working example, and is a cross-sectional view of a feeding portion M. FIG. 6B is a partial diagram showing the configuration of the molding screw in the first working example, and is a cross-sectional view of the configuration of a metering portion S and a cross-sectional view in which a protrusion/recession portion is cut at a right angle in the screw axis direction.

Figure 7A:
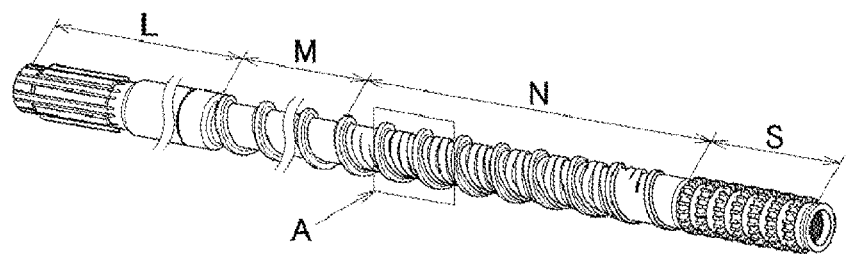
FIG. 7A is an overall schematic perspective view of the molding screw according to the first working example.
Figure 7B:
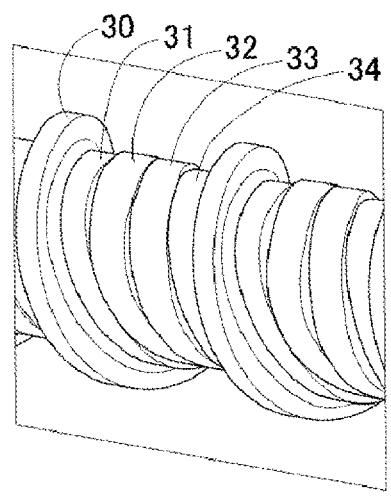
FIG. 7B is an enlarged perspective view of a portion A shown in FIG. 7A of the molding screw according to the first working example.

FIG. 7A is an overall schematic perspective view of the molding screw according to the first working example. FIG. 7B is an enlarged perspective view of a portion A shown in FIG. 7A.

Figure 8A:
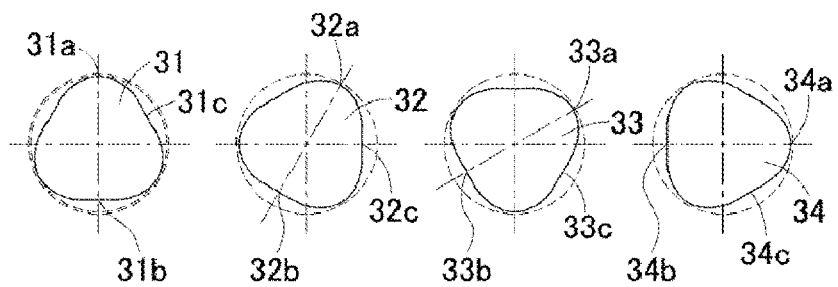
FIG. 8A is a diagram showing the shape and arrangement of sub flights of a compressing portion N of the first working example, and is a cross-sectional view showing shift angles of four sub flights.
Figure 8B:
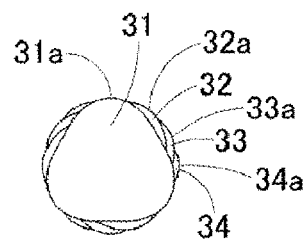
FIG. 8B is a diagram showing the shape and arrangement of the sub flights of the compressing portion N of the first working example, and is a cross-sectional view for showing the arrangement of the sub flights as viewed in the screw axis direction.

FIG. 8A is a diagram showing the shape and arrangement of sub flights of a compressing portion N of the first working example, and is a cross-sectional view showing shift angles of four sub flights. FIG. 8B is a diagram showing the shape and arrangement of the sub flights of the compressing portion N of the first working example, and is a cross-sectional view for showing the arrangement of the sub flights as viewed in the screw axis direction.

Figure 9A:
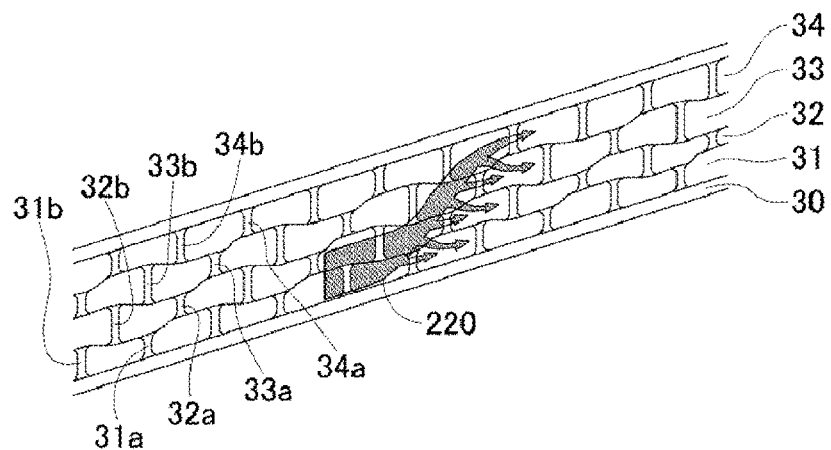
FIG. 9A is a diagram showing a state in which a molding material melts and flows in the first working example, and is a schematic diagram in which the compressing portion N has been spread out in the circumferential direction.
Figure 9B:
FIG. 9B is a diagram showing a state in which the molding material melts and flows in the first working example, and is data that reveals the flow state of the molding material.
Figure 9B:

FIG. 9A is a diagram showing a state in which a molding material melts and flows in a space between the molding screw 100 and the inner surface of a cylinder 110 in the first working example, and is a schematic diagram in which the compressing portion N has been spread out in the circumferential direction. FIG. 9B is a diagram showing a state in which the molding material melts and flows in the first working example, and is data that reveals the flow state of the molding material. In this measurement, a part of the cylinder 110 was formed using a transparent material, and a colored liquid was used instead of the molding material to determine the flow state by image capturing.

Figure 10:
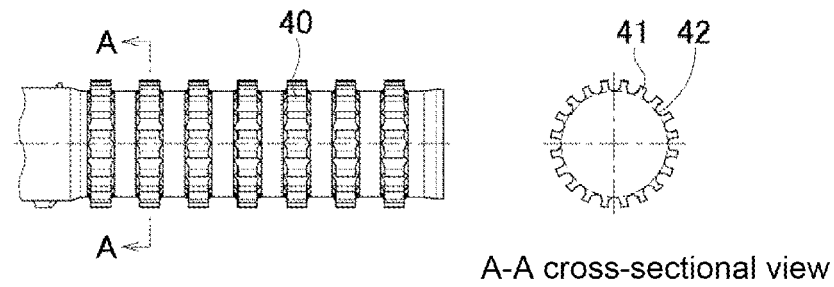
FIG. 10 includes a side view and an A-A cross-sectional view that show the arrangement of blending/aligning portions in the metering portion of the molding screw used in the first working example.

FIG. 10 includes a side view and an A-A cross-sectional view that show the arrangement of blending/aligning portions of the metering portion of the molding screw used in the first working example.

Hereinafter, the FBI molding machine, the molding screw, and the manufacturing method using the same according to the present embodiment will be described in detail with reference to these drawings.

An FBI molding machine 230 consistent with the present disclosure has the following configuration as shown in FIG. 1. This machine includes a cylinder 110 in which a heater 120 for heating the interior is arranged, a molding screw 100 rotatably provided in the cylinder 110, and a molding machine hopper 160 for introducing the molding material 220 into the cylinder 110. This machine further includes an injection portion 170 that is configured including a driving portion for rotationally driving the molding screw 100 and a back pressure applying portion for applying back pressure for pushing the molding screw toward a mold (not shown). Also, a mold (not shown), which has a cavity into which a molding material having increased fluidity is injected, is provided on the leading end portion side of the molding screw 100.

Note that in FIG. 1, a cylinder portion 150 includes the cylinder 110, the heater 120, a check valve 130, and the molding screw 100. The FBI molding machine 230 also includes a mold clamping device 190 and a safety window 180 to protect the operator from the mold (not shown) portion, and these components are disposed together on a bed 200.

Also, in the present embodiment, as shown in FIG. 2, the machine further includes a kneading portion 210 that includes a metering hopper for metering a mixture material, a resin powder, and an additive, and a mixing drum for mixing and kneading the mixture material, the resin powder, and the additive. The kneading portion 210 is constituted by a resin hopper 211 into which the resin powder is introduced, a mixture material hopper 212 into which the mixture material is introduced, a metering hopper 214 for weighing such materials, an additive hopper 213 into which the additive is introduced, and a mixing drum 215.

The resin powder and the mixture material are introduced into the resin hopper 211 and the mixture material hopper 212 respectively, and are metered by the metering hopper 214. The materials are then introduced into the mixing drum 215. At this time, a required amount of additive is also added from the additive hopper 213. These materials are then kneaded by the mixing drum 215. Accordingly, when a molding material 220 is introduced into the molding machine hopper 160, it has been uniformly mixed, and the mixture material and the resin are in an adhered state due to the additive. For this reason, even if the mixture material is solid powder made of iron or ceramic, or reinforcing fiber, more uniform blending, alignment, and kneading can be performed in the molding screw. However, the kneading portion 210 is not essential for the resin molding machine of the present disclosure, and the mixture material, the resin powder, and the additive (if necessary) may be directly introduced into the molding machine hopper 160.

Next, the molding screw 100 according to this working example will be described in detail with reference to FIGS.

5A to 10. The molding screw 100 is for use in the free blend injection molding machine 230 and includes the feeding portion M for feeding the molding material 220 and the compressing portion N and the metering portion S that extend continuously from the feeding portion M, and spiral flights 20 and 30 are respectively formed in the feeding portion M and the compressing portion N. Note that the molding screw 100 also includes a shaft portion L having the shaft 10 for connecting the molding screw 100 to the back pressure applying portion and the driving portion in the injection portion 170. As shown in, for example, FIGS. 5A, 5B, 6A, and 6B, the molding screw 100 in the feeding portion, compressing portion, and metering portions can have a consistent inner diameter (i.e., the diameter of the screw exclusive flights 20, 30, and blending/aligning portions 40).

Also, the flight 30 in the compressing portion N includes four sub flights 31, 32, 33, and 34 in this working example; the sub flights 31, 32, 33, and 34 are triangular with rounded corner portions 31a, 32a, 33a, and 34a; curved surfaces 31c, 32c, 33c, and 34c that are convex toward the screw axis center are formed between the corner portions 31a, 32a, 33a, and 34a; and the corner portions 31a, 32a, 33a, and 34a are arranged shifted by angles of or about 30° each in a view in the screw axis direction (see FIGS. 7A to 8B).

Also, the metering portion S has a configuration including a plurality of blending/aligning portions having gear-like protrusions and recessions in the circumferential direction around the screw axis. Specifically, as shown in FIG. 10, in the metering portion S, all seven of the blending/aligning portions 40 have the same shape, and recession portions 42 and protrusion portions 41 are arranged so as to match each other in the screw axis direction.

The following describes exemplary functions of the molding screw 100 having such a structure.

First, the compressing portion N will be described. The flight 30 of the compressing portion N has sub flights 31, 32, 33, and 34. The sub flights 31, 32, 33, and 34 have corner portions 31a, 32a, 33a, and 34a and curved surfaces 31c, 32c, 33c, and 34c. Their overall shape is triangular (rice ball shaped). The sub flights 31, 32, 33, and 34 are arranged so that the corner portions 31a, 32a, 33a, and 34a are shifted by an angle of or about 30° each. The corner portions 31a, 32a, 33a, and 34a are regions where the distance from the inner surface of the cylinder 110 is the smallest, and the flow of the molding material 220 is faster in these regions. On the other hand, the curved surfaces 31c, 32c, 33c, and 34c are regions where the distance between the inner surface of the cylinder 110 and bottom portions 31b, 32b, 33b, 34b, which are the bottommost portions, is the largest, and the flow of the molding material becomes slower and the kneading becomes stronger upon reaching these regions (see FIGS. 8A to 9B).

The following describes a state in which the molding material 220 flows through the sub flights 31, 32, 33, and 34 while the molding screw 100 rotates. The molding material 220 flows through the narrow regions at the corner portions 31a, 32a, 33a, and 34a, and then flows into the regions at the curved surfaces 31c, 32c, 33c, and 34c and is kneaded. The molding material 220 that has flowed through the large regions at the curved surfaces 31c, 32c, 33c, and 34c then flows into the regions at the corner portions 31a, 32a, 33a, and 34a. The flow is faster here. Upon reaching the regions at the next curved surface shapes 31c, 32c, 33c, and 34c, the flow slows down, and kneaded is performed. In this way, the flow of the molding material 220 repeatedly becomes faster and slower. Also, the fast-flowing molding material 220 and the slow-flowing molding material 220 are sometimes kneaded together in the regions at the curved surfaces 31c, 32c, 33c, and 34c. As a result, blending, kneading, and alignment proceed.

The above description is for describing functions of the sub flight 31, 32, 33, and 34 in the compressing portion N of the present disclosure, but it is not necessarily the case that all of the molding material 220 flowing through the regions at the curved surfaces 31c, 32c, 33c, and 34c flows into the regions at the corner portions 31a, 32a, 33a, and 34a, for example. There are also cases where the molding material flows from the regions at the curved surfaces 31c, 32c, 33c, and 34c to the regions of the next curved surface shapes 31c, 32c, 33c, and 34c.

FIG. 9B is an actual measurement photograph in which a part of the cylinder 110 was formed using a transparent material, a colored liquid flowed instead of the molding material, and the flow state was measured. Upon observing the flow state of the liquid, it was found that the flow state was close to the schematic diagram shown in FIG. 9A. Accordingly, it was confirmed that with the sub flight configuration of the present disclosure, good blending, alignment, and kneading were performed in the compressing portion N of the molding screw 100.

Also, because the corner portions 31a, 32a, 33a, and 34a are small arcs, the gap regions between the inner surface of the cylinder 110 and the corner portions 31a, 32a, 33a, and 34a are also small. Accordingly, the compression and pressure of the molding material 220 is high in these small regions, and thereafter the molding material 220 flows toward the regions at the curved surfaces 31c, 32c, 33c, and 34c. As a result, even if the included amount of the base resin powder is reduced and the included amount of the mixture material that is a metal or solid powder is increased, it is possible to obtain high-quality resin molded bodies that have little variation in powder mixing.

Also, a thermoplastic resin is generally used as the base resin, and therefore the fluidity increases as the temperature rises, and the fluidity decreases as the temperature falls. In the molding screw 100, when the molding material 220 reaches the regions at the corner portions 31a, 32a, 33a, and 34a, heat from the heater 120 is easily received, and melting is promoted. Also, melting and blending are repeated in the compressing portion N, and therefore the amount of the mixture material in the molding material 220 can be increased.

Next, the metering portion S will be described. In this working example, as shown in FIGS. 5A and 10, the metering portion S is configured including seven blending/aligning portions 40 that have gear-like protrusions and recessions in the circumferential direction around the screw axis. Specifically, as shown in FIG. 10, in the metering portion S, all seven of the blending/aligning portions 40 have the same shape, and the recession portions 42 and the protrusion portions 41 are arranged so as to match each other in the screw axis direction.

In this working example, the metering portion S is provided with seven blending/aligning portions 40 in order for further uniform alignment in the metering portion S and the nozzle portion connected thereto. The blending/aligning portions 40 are each provided with a plurality of arrowhead-shaped protrusion portions 41 in the circumferential direction, and are each shaped like a gear overall. As a result, the regions through which the molding material 220 passes are rectified such that the molding material 220 cannot pass through all at once. As a result, more uniform blending and alignment are possible.

The following describes roles of the compressing portion N and the metering portion S of the molding screw 100 of the present disclosure. The main function of the compressing portion N is to sufficiently blend and knead the molding material to ensure reaction with the additive. The main function of the metering portion S is to eliminate variation in (perform alignment of) the composition by overall homogenizing the state in which the mixture material and the resin powder are sufficiently adhered by the additive.

In the molding screw 100 according to this working example, because the compressing portion N and the metering portion S have the above-described structure, in the regions where the distance between the cylinder 110 and the sub flights 31, 32, 33, and 34 is small (in the gaps between the cylinder inner surface and the corner portions 31*a*, 32*a*, 33*a*, and 34*a* of the sub flights 31, 32, 33, and 34), stronger compressive force acts on the molding material 220, and the molding material 220 moves faster. On the other hand, in the regions where the distance is large (in the gaps between the cylinder inner surface and the bottom portions 31*b*, 32*b*, 33*b*, and 34*b* of the sub flights 31, 32, 33, and 34), less compressive force acts on the molding material 220, and it moves slower. Due to this repeated fast and slow movement, kneading proceeds further.

The following describes results of manufacturing resin molded bodies using the FBI molding machine that employs the molding screw according to this working example.

Polypropylene (PP) was used as the resin powder, and glass fiber (GF) having a fiber length of 3 mm was used as the mixture material to make the molding material. Note that an additive and the like were also mixed in. The molding material was used to manufacture molded bodies using the FBI molding machine, and then the fiber length distribution of fibers remaining in the molded bodies was measured. Also, commercially available long-fiber pellets were used to manufacture molded bodies using a conventional injection molding machine, and the fiber length distribution of fibers remaining in the molded bodies was similarly measured. Results of the comparison are shown in FIGS. 11A and 11B.

Figure 11A:
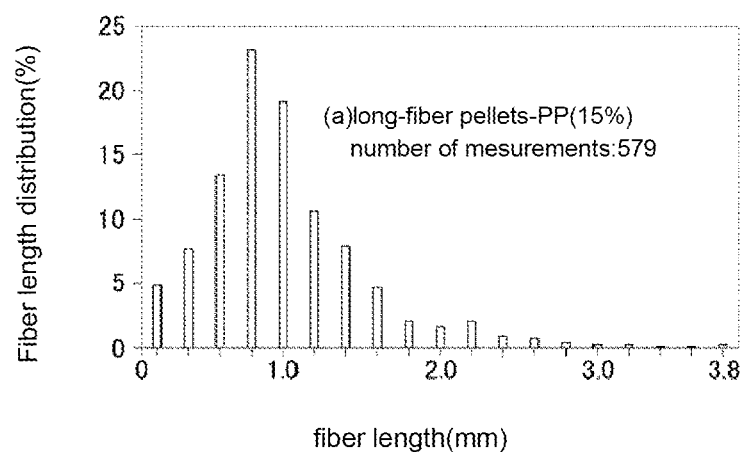
FIG. 11A is a diagram showing a distribution of the lengths of fibers remaining in a molded body when the molded body has been manufactured by a conventional molding machine as a comparative example in the first working example.
Figure 11B:
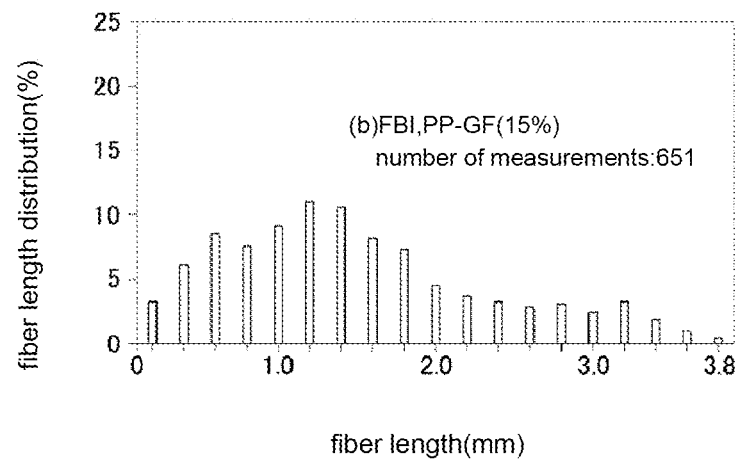
FIG. 11B is a diagram showing a distribution of the lengths of fibers remaining in a molded body when the molded body has been manufactured by the FBI molding machine of the present embodiment in the first working example.

FIG. 11A is a fiber length distribution diagram for fibers remaining in molded bodies when the molded bodies were manufactured by a conventional molding machine, and is a comparative example. FIG. 11B is a fiber length distribution diagram for fibers remaining in molded bodies when the molded bodies were manufactured by the FBI molding machine of this working example. It can be seen that the proportion of long fibers that remain was large when the FBI molding machine of the present disclosure was used. This is because the proportion of fibers that were broken in the compressing portion and the metering portion of the molding screw was small, and blending and alignment were sufficiently performed. Also, when the molding conditions were determined and continuous molding was performed, the weight variation (3σ/weight) per shot could be reduced to 1% or less.

Also, molded bodies were obtained by performing molding with the FBI molding machine of the present disclosure with use of a molding material containing 34.1% nylon (6PA) and 60% glass fiber (GF), and such molded bodies had a tensile strength of 233 MPa and a tensile modulus of 5280 MPa. This strength could not be obtained for a molded body manufactured using conventional pellets.

Second Working Example

Figure 12A:
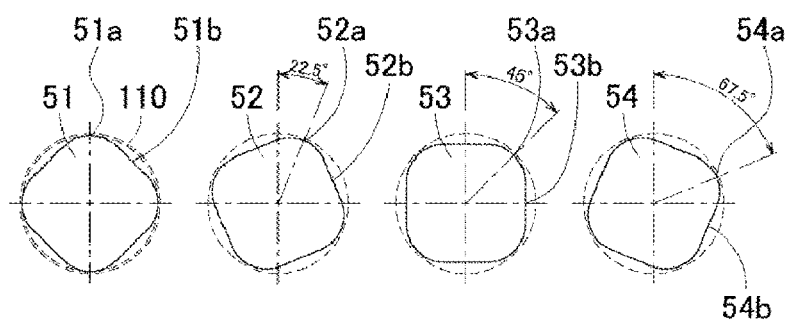
FIG. 12A is a diagram showing the shape of sub flights of a compressing portion according to a second working example of the present disclosure.
Figure 12B:
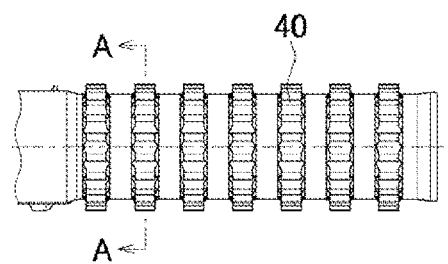
FIG. 12B is a side view showing the shape of blending/aligning portions in a metering portion according to the second working example.
Figure 12C:
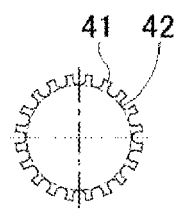
FIG. 12C is an A-A cross-sectional view of blending/aligning portions in the metering portion according to the second working example.

A molding machine screw, an FBI molding machine, and a manufacturing method using the same according to a second working example of the present disclosure are described below with reference to the drawings. In this working example, the sub flights and blending/aligning portions shown in FIGS. 12A to 12C were used. FIG. 12A is a diagram showing the shape of the sub flights of the compressing portion according to this working example. FIG. 12B is a side view showing the shape of the blending/aligning portions in the metering portion, and FIG. 12C is an A-A cross-sectional view of the blending/aligning portions.

As shown in FIG. 12A, there are four sub flights 51, 52, 53, and 54 in the compressing portion N of this working example, the sub flights 51, 52, 53, and 54 each have a square shape, and corner portions 51*a*, 52*a*, 53*a*, and 54*a* are arranged with angles shifted by or about 22.5° each in a view in the screw axis direction. Note that the blending/aligning portions 40 shown in FIGS. 12B and 12C are the same as the blending/aligning portions in the metering portion S according to the first working example, and thus are not described below.

In the molding screw according to this working example, in regions where the distance between the cylinder 110 and the sub flights 51, 52, 53, and 54 is small (in the gaps between the inner surface of the cylinder 110 and the corner portions 51*a*, 52*a*, 53*a*, and 54*a*), stronger compressive force acts on the molding material, and the molding material moves faster. On the other hand, in regions where the aforementioned distance is large (in the gaps between the inner surface of the cylinder 110 and the bottom portions 51*b*, 52*b*, 53*b*, and 54*b* of the sub flights 51, 52, 53, and 54), relatively smaller compressive force acts on the molding material, and the molding material moves slower. However, these regions having a larger distance are smaller than the gaps at the curved surfaces 31*c*, 32*c*, 33*c*, and 34*c* of the sub flights 30, 32, 33, and 34 according to the first working example.

An FBI molding machine that employs such a molding screw is suitable when using a solid powder in which the mixture material serving as a molding material is a solid. For example, when copper powder or iron powder is used, the difference in specific gravity between these powders and the resin is large. For this reason, if triangular sub flights are used, the resin tends to flow first, the copper powder or iron powder tend to flow later, and variations tend to occur in the composition. In the molding screw according to this working example, the sub flights have a quadrangular shape, and the number of corner portions is higher. With this structure, the flow of the resin can be suppressed, and the resin can be caused to flow in accordance with the flow of the copper powder or the iron powder. As a result, even when the difference in specific gravity between the resin and the iron powder or the copper powder is large, uniform mixing can be performed, and it is possible to reduce quality variation and manufacturing variation of molded bodies.

A molded body was manufactured using an FBI molding machine provided with this molding screw, and using nylon (6PA) as the resin powder and copper slag powder as the mixture material. In the molding material, 46.1% was nylon (6PA), 50% was copper slag powder, and the rest was an additive. Using this molding material, injection molding was performed with an FBI molding machine provided with the molding screw according to this working example. The obtained molded product had a specific gravity of 2.79, a tensile strength of 113 MPa, and a Charpy impact strength of 18.5 kJ/m$^2$, and it was possible to obtain a copper slag-including resin molded article having a higher strength than a conventional article.

Third Working Example

Figure 13A:
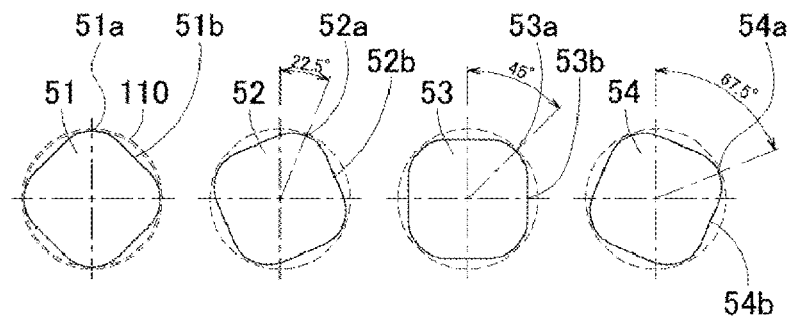
FIG. 13A is a cross-sectional view showing the shape and arrangement configuration of sub flights of a compressing portion according to a third working example of the present disclosure.
Figure 13B:
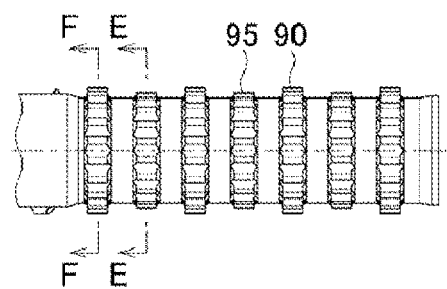
FIG. 13B is a side view showing the configuration of a metering portion according to the third working example.
Figure 13C:
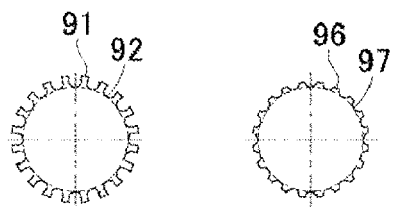
FIG. 13C includes an E-E cross-sectional view and an F-F cross-sectional view of blending/aligning portions in the metering portion according to the third working example.

A molding machine screw, an FBI molding machine, and a manufacturing method using the same according to a third working example of the present disclosure are described below with reference to the drawings. The FBI molding machine according to this working example is the same as the injection molding machine 230 described in the first working example, and thus is not described below. The overall shape of the molding screw is the same as that shown in FIG. 4A. In view of this, the following describes differences from the molding screw 100 according to the first working example. FIG. 13A is a cross-sectional view showing the shape and arrangement configuration of sub flights of the compressing portion according to this working example. FIG. 13B is a side view showing the configuration of the metering portion. FIG. 13C is an E-E cross-sectional view and an F-F cross-sectional view of the blending/aligning portions.

The shape and arrangement of the sub flights 51, 52, 53, and 54 in the compressing portion N shown in FIG. 13A are the same as those of the sub flights in the second working example, and thus are not described below.

As shown in FIGS. 13B and 13C, the metering portion S includes a plurality of blending/aligning portions 90 and 95 in which the gear-like protrusions and recessions have different shapes. The blending/aligning portions 90 and 95 are alternatingly arranged such that the shapes of the gear-like protrusions and recessions are different in adjacent portions. Specifically, the number of protrusion portions 91 and 96 and the number of recession portions 92 and 97 are both the same in the blending/aligning portions 90 and the blending/aligning portions 95. However, the protrusion portions 96 of the blending/aligning portions 95 are lower than the protrusion portions 91 of the blending/aligning portions 90. The blending/aligning portions 90 and the blending/aligning portions 95 are alternatingly arranged at the same distance from each other.

A molded body was manufactured using an FBI molding machine provided with this molding screw, and using polypropylene (PP) as the resin powder and ceramic powder as the mixture material. In the molding material, 46.7% was polypropylene (PP), 50.0% was ceramic powder, and the rest was an additive. Using this molding material, injection molding was performed with an FBI molding machine provided with the molding screw according to this working example. The obtained molded product had a specific gravity of 1.27, a tensile strength of 23.5 MPa, and a Charpy impact strength of 15.0 kJ/m$^2$, and it was possible to obtain a ceramic powder-including resin molded article that has a higher strength than a conventional product.

Fourth Working Example

A molding machine screw, an FBI molding machine, and a manufacturing method using the same according to a fourth working are described below with reference to the drawings. The FBI molding machine according to this working example is the same as the injection molding machine 230 described in the first working example, and thus is not described below. The overall shape of the molding screw is the same as that shown in FIG. 4A. In view of this, the following describes differences from the molding screw 100 according to the first working example.

Figure 14A:
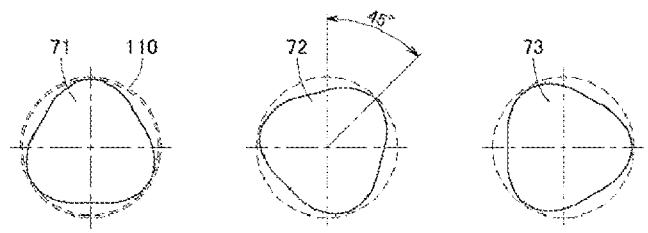
FIG. 14A is a cross-sectional view showing the shape and arrangement configuration of sub flights of a compressing portion according to a fourth working example of the present disclosure.
Figure 14B:
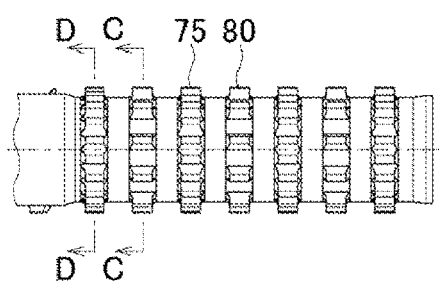
FIG. 14B is a side view showing the configuration of a metering portion according to the fourth working example.
Figure 14C:
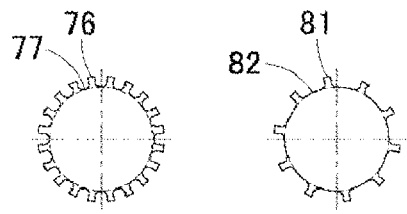
FIG. 14C includes a C-C cross-sectional view and a D-D cross-sectional view of blending/aligning portions in the metering portion according to the fourth working example.

FIG. 14A is a cross-sectional view showing the shape and arrangement configuration of sub flights 71, 72, and 73 in the compressing portion according to this working example. FIG. 14B is a side view showing the configuration of the metering portion. FIG. 14C is a C-C cross-sectional view and a D-D cross-sectional view of the blending/aligning portions.

There are four sub flights 31, 32, 33, and 34 in the compressing portion N of the molding screw 100 according to the first working example, each having a triangular shape with rounded corner portions. The sub flights 71, 72, and 73 in the compressing portion N according to this working example are also the same in that they have a triangular shape with rounded corner portions. However, three sub flights are provided, and they are shifted by an angle of or about 45° each.

As shown in FIGS. 14B and 14C, the metering portion S is constituted by a plurality of blending/aligning portions 75 and 80 that have different numbers of gear-like protrusions and recessions, and the blending/aligning portions 75 and 80 are alternatingly arranged such that the numbers of gear-like protrusions and recessions are different between adjacent portions. Specifically, the blending/aligning portions 75 are each shaped as a gear that has 20 protrusion portions 76 and 20 recession portions 77. On the other hand, the blending/aligning portions 80 are each shaped as a gear that has 10 protrusion portions 81 and 10 recession portions 82. The blending/aligning portions 75 and the blending/aligning portions 80 are alternatingly arranged at the same distance from each other.

When fibers such as glass fibers or carbon fibers are used as the mixture material, a reduction in the breakage of the fibers is required. For this reason, the number of protrusion portions is reduced such that the fibers can smoothly flow toward the outlet. In other words, the number of protrusion portions 81 of the blending/aligning portion 80 is reduced to half in the blending/aligning portions 80, and thus the fibers flow smoothly, and the breakage of the fibers due to rotation of the screw can be suppressed.

A molded body was manufactured using an FBI molding machine provided with this molding screw, and using nylon (6PA) as the resin powder and glass fiber as the mixture material. In the molding material, 34.1% was nylon (6PA), 60.0% was glass fiber, and the rest was an additive. Using this molding material, injection molding was performed with an FBI molding machine provided with the molding screw according to this working example. The obtained molded product had a specific gravity of 1.65, a tensile strength of 233 MPa, and a tensile elastic modulus of 5280 MPa, and it was possible to obtain a glass fiber-including resin molded article that has a higher strength than a conventional product.

Fifth Working Example

A molding machine screw, an FBI molding machine, and a manufacturing method using the same according to a fifth working example are described below with reference to the drawings. The FBI molding machine according to this working example is the same as the injection molding machine 230 described in the first working example, and thus is not described below. The overall shape of the molding screw is the same as that shown in FIG. 4A. In view of this, the following describes differences from the molding screw 100 according to the first working example.

Figure 15A:
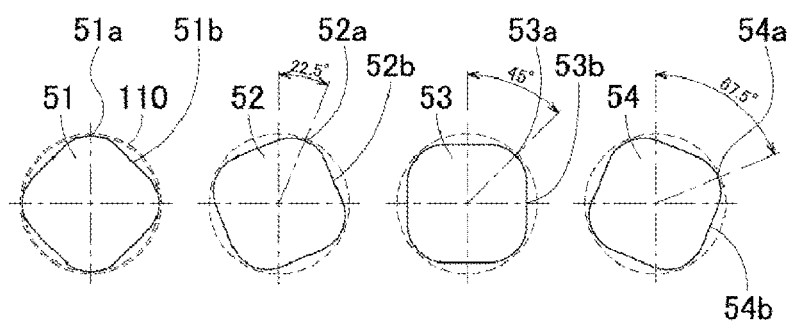
FIG. 15A is a cross-sectional view showing the shape and arrangement of sub flights of a compressing portion according to a fifth working example of the present disclosure.
Figure 15B:
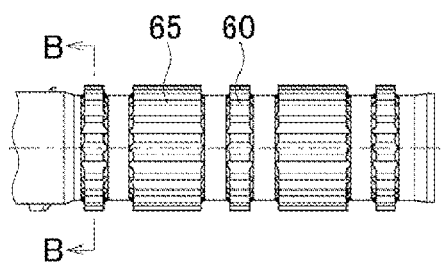
FIG. 15B is a side view showing a configuration of a metering portion according to the fifth working example.
Figure 15C:
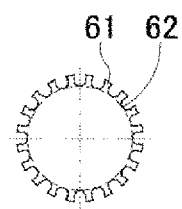
FIG. 15C is a B-B cross-sectional view showing a configuration of blending/aligning portions in the metering portion according to the fifth working example.

FIG. 15A is a cross-sectional view showing the shape and arrangement state of sub flights of the compressing portion according to this working example. FIG. 15B is a side view showing the configuration of the metering portion. FIG. 15C is a B-B cross-sectional view showing the configuration of blending/aligning portions.

The shape of the sub flights of the compressing portion N shown in FIG. 15A is the same as the shape of the sub flights of the compressing portion N of the molding screw according to the second working example, and thus is not described below.

As shown in FIGS. 15B and 15C, the metering portion S according to this working example is constituted by a plurality of blending/aligning portions 60 and 65 that have different lengths in the screw axis direction. The blending/aligning portions are alternatingly arranged such that the lengths are different between adjacent portions. Also, the number of protrusion portions 61 and recession portions 62 is the same in the blending/aligning portions 60 and 65, and the protrusion portions 61 and the recession portions 62 are arranged so as to match each other in the screw axis direction.

When fibers such as glass fibers or carbon fibers are used as the mixture material, reducing the amount of breakage of the fibers is effective in order to increase the strength of the molded body. For this reason, in this working example, the length of the blending/aligning portions 65 is increased. With such a structure, breakage of the fibers can be suppressed, and the fibers can flow smoothly toward the outlet.

A molded body was manufactured using an FBI molding machine provided with this molding screw, and using polypropylene (PP) as the resin powder and glass fiber as the mixture material. In the molding material, 54.1% was polypropylene (PP), 40.0% was glass fiber, and the rest was an additive. Using this molding material, injection molding was performed with an FBI molding machine provided with the molding screw according to this working example. The obtained molded product had a specific gravity of 1.2, a tensile strength of 76 MPa, a tensile elastic modulus of 3120 MPa, and a Charpy impact strength of 30.7 MPa. It was possible to obtain a glass fiber-including resin molded article that has a higher strength than a conventional product, and the resin molded article could replace some metal products.

Note that these working examples are merely examples, and the present disclosure is not limited to these working examples. For example, when fibers such as glass fibers or carbon fibers are used as the mixture material, in order to reduce fiber breakage, the number of protrusion portions may be further reduced, or the number of blending/aligning portions may be reduced.

On the other hand, when iron powder or ceramic powder is used as the mixture material, the difference between the specific density thereof and the specific density of the resin is significant, and therefore in order to achieve uniform blending and alignment in such a case, the number of protrusion portions may be increased, or the number of blending/aligning portions may be increased.

Also, in the case where wood powder, coffee slag powder, or the like is used as the mixture material, if the mixture material moves slowly in the compressing portion N, overheating and carbonization may occur. However, if the mixture material moves too quickly, it moves to the metering portion S without being blended and kneaded sufficiently, and quality variation of the molded bodies increases. In such a case, the shape of the molding screw is selected such that the molding material flows faster than in the case of using fiber or a metal powder even while being subjected to sufficient compressive force and freed from such compressive force in the compressing portion N. Accordingly, carbonization due to overheating can be suppressed, and molded bodies with stable quality can be manufactured.

As described above, with the molding screw according to the present disclosure and the FBI molding machine, it is possible to obtain resin molded articles that have little variation and high mechanical strength even when directly using a mixture material that is any of various recycled raw materials such as iron powder or other metal powders, plant-derived powders such as wood powders, or crushed powders such as ceramic powders, which have conventionally been difficult to use due to large variations in quality.

Note that the present disclosure is not limited to the first to fifth working examples, and as long as the basic configurations of the sub flights of the compressing portion and the blending/aligning portions in the metering portion in the molding screw are the same, the shapes thereof, the number thereof, and the like can be appropriately selected in accordance with the molding material.

For example, the polygonal shape of the sub flights of the compressing portion is not limited to being triangular or quadrangular, and may also be a polygon having five to eight sides. Furthermore, the number of flights of the compressing portion may be increased or decreased in accordance with the molding material.

Also, as long as the blending/aligning portions in the metering portion also have gear-like protrusions and recessions, the height and shape of the protrusion portions may be changed. Also, three or more blending/aligning portions having different protrusion/recession shapes may be included. In this case, it is preferable that adjacent blending/aligning portions have at least different shapes.

The invention claimed is:

1. A molding screw for use in a free blend injection molding machine, the molding screw comprising:
    a feeding portion configured to feed a molding material, the molding material comprising: a mixture material, a resin powder, and an additive; and
    a compressing portion and a metering portion that extend continuously from the feeding portion;
    wherein a spiral flight is formed in each of the feeding portion and the compressing portion;
    wherein the feeding portion, compressing portion, and metering portion are formed from a single shaft, the shaft having a consistent inner diameter along each of the feeding portion, compressing portion, and metering portion;
    wherein the diameter of the bottom of the groove in the feeding portion and the diameter of the bottom of the groove in the metering portion are the same;
    wherein the flight of the compressing portion includes a plurality of sub flights that extend in a spiral manner in a screw axis direction;
    wherein the sub flights each have a polygonal shape with rounded corner portions;
    wherein the sub flights are arranged such that the corner portions are shifted by a set angle with respect to the screw axis, and the sub flights are formed such that gaps between a cylinder inner surface and the corner portions are relatively smaller than gaps between the cylinder inner surface and central portions between the corner portions; and
    wherein the metering portion is provided with a plurality of blending portions each having protrusions and recessions in a circumferential direction about the screw axis.

2. The molding screw according to claim 1,
wherein four of the sub flights are provided, and
the sub flights are each shaped as an equilateral triangle, have curved surfaces that recede toward the screw axis between the corner portions, and are arranged such that the corner portions are shifted by an angle of about 30 degrees each in a view along the screw axis direction.

3. The molding screw according to claim 1,
wherein four of the sub flights are provided, and
the sub flights are each shaped as a square, and are arranged such that the corner portions are shifted by an angle of about 22.5 degrees each in a view along the screw axis direction.

4. The molding screw according to claim 1,
wherein three of the sub flights are provided, and
the sub flights are each shaped as an equilateral triangle, have curved surfaces that recede toward the screw axis between the corner portions, and are arranged such that the corner portions are shifted by an angle of about 45 degrees each in a view along the screw axis direction.

5. The molding screw according to claim 1,
wherein the blending portions of the metering portion have an identical shape and are arranged such that positions of the protrusions and recessions match each other.

6. The molding screw according to claim 1,
wherein the blending portions of the metering portion have different lengths in the screw axis direction, are arranged such that the length is different between adjacent blending portions, and are arranged such that positions of the protrusions and recessions match each other.

7. The molding screw according to claim 1,
wherein the blending portions of the metering portion have different numbers of protrusions and recessions and are arranged such that the number of protrusions and recessions is different between adjacent blending portions.

8. The molding screw according to claim 1,
wherein the blending portions of the metering portion have different shapes of protrusions and recessions and are arranged such that the shape of the protrusions and recessions is different between adjacent blending portions.

* * * * *